(12) United States Patent
Yu et al.

(10) Patent No.: US 10,659,725 B2
(45) Date of Patent: May 19, 2020

(54) IMAGE PROCESSING DEVICE AND IMAGE PROCESSING METHOD

(71) Applicant: REALTEK SEMICONDUCTOR CORPORATION, Hsinchu (TW)

(72) Inventors: Chia-Wei Yu, Hsinchu County (TW); Cheng-Hsin Chang, Hsinchu (TW); Chun-Hsing Hsieh, Hsinchu (TW); Chi-Hsiung Cheng, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 16/298,478

(22) Filed: Mar. 11, 2019

(65) Prior Publication Data

US 2019/0289256 A1    Sep. 19, 2019

(30) Foreign Application Priority Data

Mar. 19, 2018    (TW) .............................. 107109292 A (51) Int. Cl.
*H04N 7/01*    (2006.01)

(52) U.S. Cl.
CPC ................................. *H04N 7/0127* (2013.01)

(58) Field of Classification Search
CPC ........................... H04N 7/0115; H04N 7/0127
See application file for complete search history.

(56) References Cited

U.S. PATENT DOCUMENTS

| 5,343,248 | A | * | 8/1994 | Fujinami | ............. | H04N 5/9264 |
|||||||348/452|
| 5,585,856 | A | * | 12/1996 | Nakaya | ................. | G09G 5/391 |
|||||||348/441|
| 5,742,351 | A | * | 4/1998 | Guede | .................. | H04N 7/0112 |
|||||||348/459|
| 5,828,786 | A | * | 10/1998 | Rao | ..................... | G06K 9/00711 |
|||||||382/236|
| 5,898,461 | A | * | 4/1999 | Ohsawa | ................... | H04N 7/15 |
|||||||348/E7.083|
| 7,158,186 | B2 | | 1/2007 | Selby et al. | | |
| 7,349,029 | B1 | * | 3/2008 | Chou | .................. | H04N 7/0112 |
|||||||348/441|

(Continued)

FOREIGN PATENT DOCUMENTS

| CN | 1574952 B | 5/2010 |
| TW | I398159 | 6/2013 |

OTHER PUBLICATIONS

Taiwan Intellectual Property Office, Office Action dated Oct. 23, 2018. English summary on p. 1.

*Primary Examiner* — Brian P Yenke
(74) *Attorney, Agent, or Firm* — WPAT, PC (57) ABSTRACT

The present invention discloses an image processing device and an image processing method. The image processing method includes steps of: referring to multiple frames or an auxiliary data associated with the frames to determine whether the frames contain substantially the same frames; selecting the frames according to whether the frames contain substantially the same frames to generate multiple selected frames; and performing video processing on the selected frames. When the frames do not contain substantially the same frames, the selected frames are the same as the frames, and when the frames contain substantially the same frames, the selected frames are part of the frames.

4 Claims, 6 Drawing Sheets

(56) References Cited

U.S. PATENT DOCUMENTS

| | | | |
|---|---|---|---|
| 8,004,607 B2 * | 8/2011 | Eymard | H04N 7/0115 348/441 |
| 8,134,640 B2 * | 3/2012 | Doswald | H04N 7/0112 348/441 |
| 8,300,145 B2 | 10/2012 | Wu et al. | |
| 8,334,931 B2 * | 12/2012 | Nishio | H04N 5/202 348/441 |
| 8,570,435 B2 * | 10/2013 | Gong | G09G 3/20 348/256 |
| 9,491,398 B1 * | 11/2016 | Hou | H04N 7/0127 |
| 9,538,051 B2 * | 1/2017 | Tung | H04N 5/21 |
| 9,743,036 B2 * | 8/2017 | Tann | H04N 7/0127 |
| 9,832,421 B2 * | 11/2017 | Liu | H04N 7/0125 |
| 9,973,661 B2 * | 5/2018 | Brasnett | H04N 7/012 |
| 10,250,891 B2 * | 4/2019 | Kazui | H04N 19/58 |
| 2004/0001550 A1 * | 1/2004 | Grandbois | H04N 5/4401 375/240.25 |
| 2007/0258014 A1 * | 11/2007 | Doswald | H04N 7/0115 348/701 |
| 2010/0026886 A1 * | 2/2010 | Sharlet | H04N 5/145 348/441 |
| 2010/0188570 A1 * | 7/2010 | Gong | H04N 7/012 348/448 |
| 2010/0253838 A1 * | 10/2010 | Garg | H04N 7/0115 348/452 |
| 2010/0309372 A1 * | 12/2010 | Zhong | H04N 7/012 348/452 |
| 2011/0013081 A1 * | 1/2011 | Wredenhagen | H04N 7/0112 348/449 |
| 2014/0028909 A1 * | 1/2014 | Tanigawa | H04N 7/0127 348/441 |
| 2015/0215498 A1 * | 7/2015 | Tung | H04N 5/21 386/353 |
| 2016/0286222 A1 * | 9/2016 | Kazui | H04N 19/58 |
| 2018/0227465 A1 * | 8/2018 | Brasnett | H04N 7/012 |

* cited by examiner

IMAGE PROCESSING DEVICE AND IMAGE PROCESSING METHOD

BACKGROUND OF THE INVENTION

1. Field of the Invention

The present invention relates to an image processing device and an image processing method, and, more particularly, to an image processing device and an image processing method applied to a pull-up signal.

2. Description of Related Art

Figure 1:
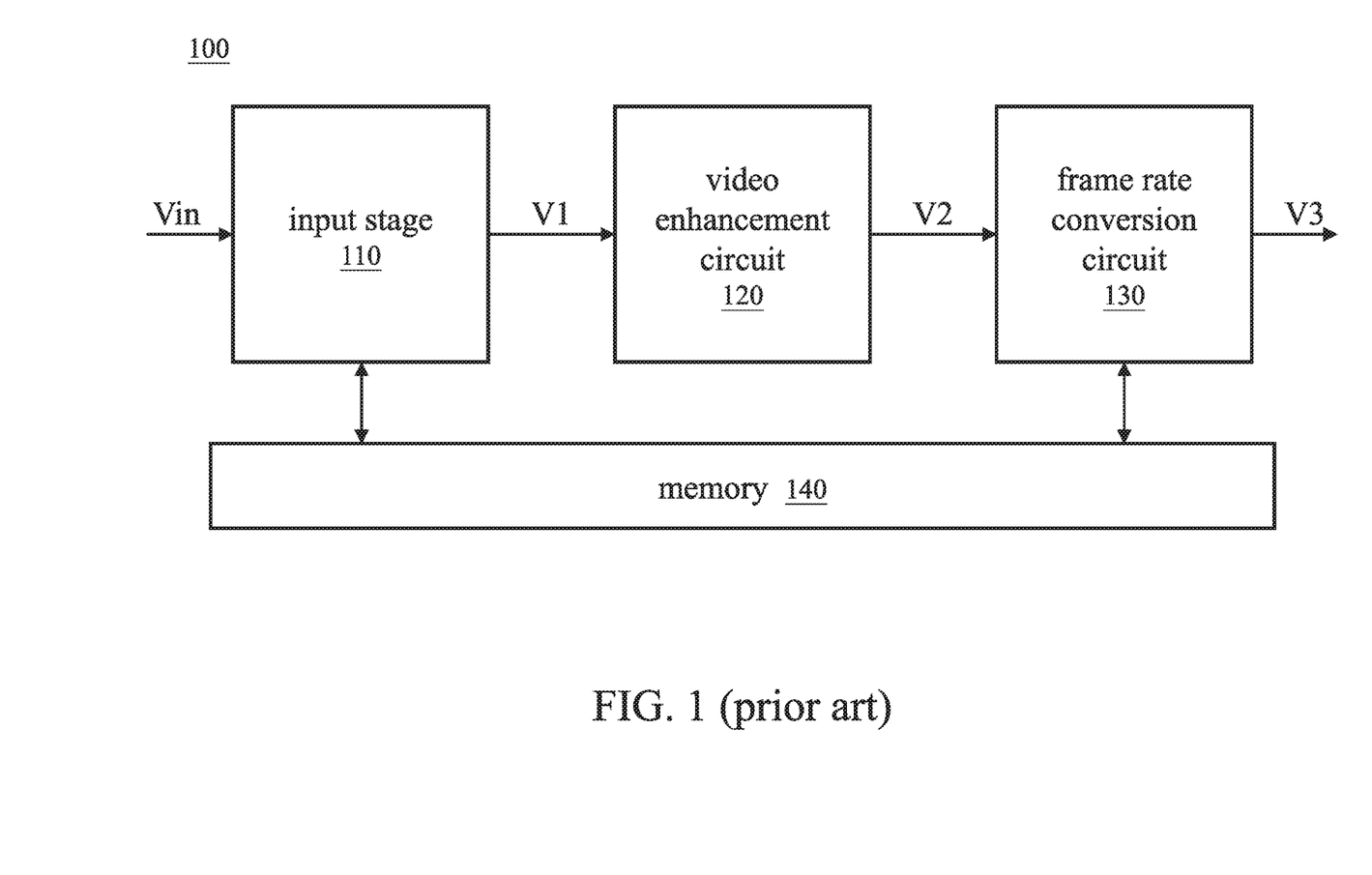
FIG. 1 illustrates a functional block diagram of a conventional image processing device.

FIG. 1 is a functional block diagram of a conventional image processing device. The image processing device 100 includes an input stage 110, a video enhancement circuit 120, a frame rate conversion circuit 130, and a memory 140. The input stage 110 performs pre-processing on the video signal Vin, for example, decoding the video signal Vin. During the decoding process, the input stage 110 needs to write/read video data into/from the memory 140. After the decoding process is completed, the input stage 110 outputs the video data V1 to the video enhancement circuit 120. If the video signal Vin is a video signal that does not need decoding, the input stage 110 can directly output the video data V1. The video enhancement circuit 120 performs video enhancement processing (such as noise reduction, sharpness improvement, and scaling) on the video data V1, and then outputs the video data V2. The frame rate conversion circuit 130 performs frame rate conversion on the video data V2, for example, converting the video from 60 frames per second (fps) to 120 fps. The frame rate conversion circuit 130 needs to write/read the video data into/from the memory 140 during the frame rate conversion, and outputs the video data V3 after the conversion is completed.

Figure 2:
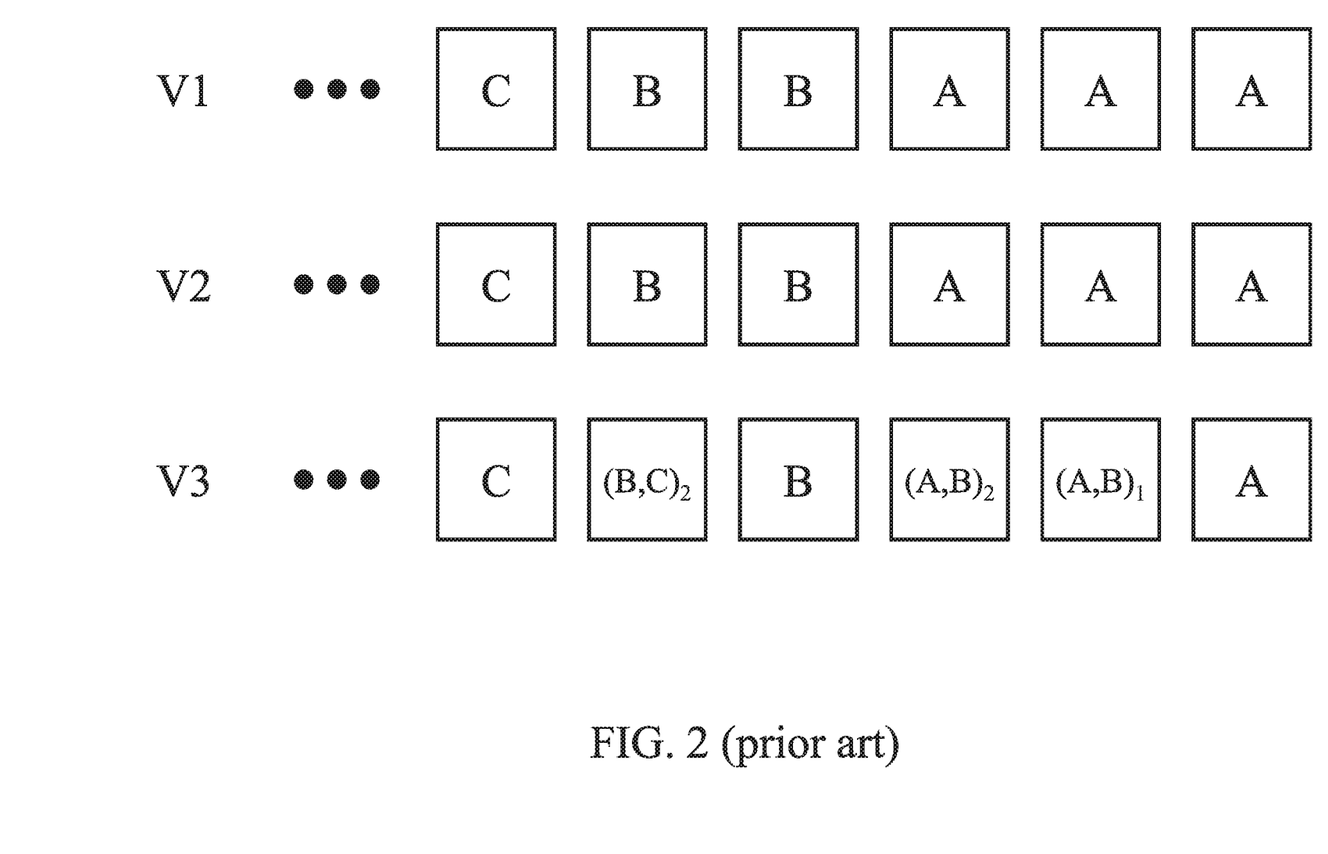
FIG. 2 illustrates a change in frames of a conventional image processing device.

When the video signal Vin is a pull-up signal, the video data V1, the video data V2, and the video data V3 may include the frames shown in FIG. 2. Visit en.wikipedia.org/wiki/Three-two_pull_down for more information about pull-up signals. As shown in FIG. 2, both the video data V1 and the video data V2 include repeated frames (including at least three frame (A) and two frame (B)). After receiving the video data V2, the frame rate conversion circuit 130 stores the video data V2 in the memory 140; the frame rate conversion circuit 130 then selects one of the repeated frames from the video data V2 (for example, selecting one of the three frame (A), selecting one of the two frame (B), . . . ), and then generates the video data V3 based on the selected frames. The frame rate conversion circuit 130 can use the motion estimation motion compensation (MEMC) technique to generate the video data V3, and, in principle, the video data V3 does not contain repeated frames. In this example, the frame rate conversion circuit 130 generates frame (A, B)1 and frame (A, B)2 according to frame (A) and frame (B), and generates frame (B, C)2 according to frame (B) and frame (C). Frame (A, B)1 stands for the first frame generated from frame (A) and frame (B), and (B, C)2 stands for the second frame generated from frame (B) and frame (C).

As can be seen from FIG. 1 and FIG. 2, although there are practically only three frames, the video enhancement circuit 120 processes six frames while processing the video data V2. In other words, three video enhancement processes are repeated (more specifically, frame (A) can be processed once rather than three times, and frame (B) can be processed once rather than twice). The frame rate conversion circuit 130 also writes the repeated frames into the memory 140. These operations cause increased power consumption, increased demand for the memory 140, and wasted memory bandwidth.

SUMMARY OF THE INVENTION

In view of the issues of the prior art, an object of the present invention is to provide an image processing device and an image processing method to reduce circuit power consumption and the demand for memory bandwidth, so as to make an improvement to the prior art.

An image processing device is provided. The image processing device includes a decoder, a film mode detection circuit, a frame sequence control circuit, and a video enhancement circuit. The decoder is configured to decode a video signal to generate a plurality of frames and frame order information indicating the order of the frames. The film mode detection circuit is coupled to the decoder and configured to refer to the frame order information to determine, according to an image data, whether the frames contain substantially the same frames. The frame sequence control circuit is coupled to the film mode detection circuit and configured to select the frames according to whether the frames contain substantially the same frames to generate a plurality of selected frames. The video enhancement circuit is coupled to the frame sequence control circuit and configured to perform video processing on the selected frames. When the frames do not contain substantially the same frames, the selected frames are the same as the frames, and when the frames contain substantially the same frames, the selected frames are part of the selected frames.

An image processing method is also provided. The image processing method includes the following steps: decoding a video signal to generate a plurality of frames and frame order information indicating the order of the frames; referring to the frame order information to determine, according to an image data, whether the frames contain substantially the same frames; selecting the frames according to whether the frames contain substantially the same frames to generate a plurality of selected frames; and performing video processing on the selected frames. When the frames do not contain substantially the same frames, the selected frames are the same as the frames, and when the frames contain substantially the same frames, the selected frames are part of the selected frames.

An image processing device is also provided. The image processing device includes a film mode detection circuit, a frame sequence control circuit, and a video enhancement circuit. The film mode detection circuit is configured to refer to a plurality of frames or an auxiliary data associated with the frames to determine whether the frames contain substantially the same frames. The frame sequence control circuit is coupled to the film mode detection circuit and configured to select the frames according to whether the frames contain substantially the same frames to generate a plurality of selected frames. The video enhancement circuit is coupled to the frame sequence control circuit and configured to perform video processing on the selected frames. When the frames do not contain substantially the same frames, the selected frames are the same as the frames, and when the frames contain substantially the same frames, the selected frames are part of the selected frames.

An image processing method is also provided. The image processing method includes the following steps: referring to a plurality of frames or an auxiliary data associated with the frames to determine whether the frames contain substantially the same frames; selecting the frames according to whether the frames contain substantially the same frames to generate a plurality of selected frames; and performing video processing on the selected frames. When the frames do not contain substantially the same frames, the selected frames are the same as the frames, and when the frames contain substantially the same frames, the selected frames are part of the selected frames.

According to the present invention, the image processing device and the image processing method can reduce the amount of data to be processed before performing video enhancement and frame rate conversion. Compared with the conventional technology, the image processing device and the image processing method of the present invention can reduce circuit power consumption and the demand for the memory bandwidth.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly.

The disclosure herein includes an image processing device and an image processing method. On account of that some or all elements of the image processing device could be known, the detail of such elements is omitted provided that such detail has little to do with the features of this disclosure and this omission nowhere dissatisfies the specification and enablement requirements. Some or all of the processes of the image processing method may be implemented by software and/or firmware, and can be performed by the image processing device or its equivalent. A person having ordinary skill in the art can choose components or steps equivalent to those described in this specification to carry out the present invention, which means that the scope of this invention is not limited to the embodiments in the specification.

Figure 3:
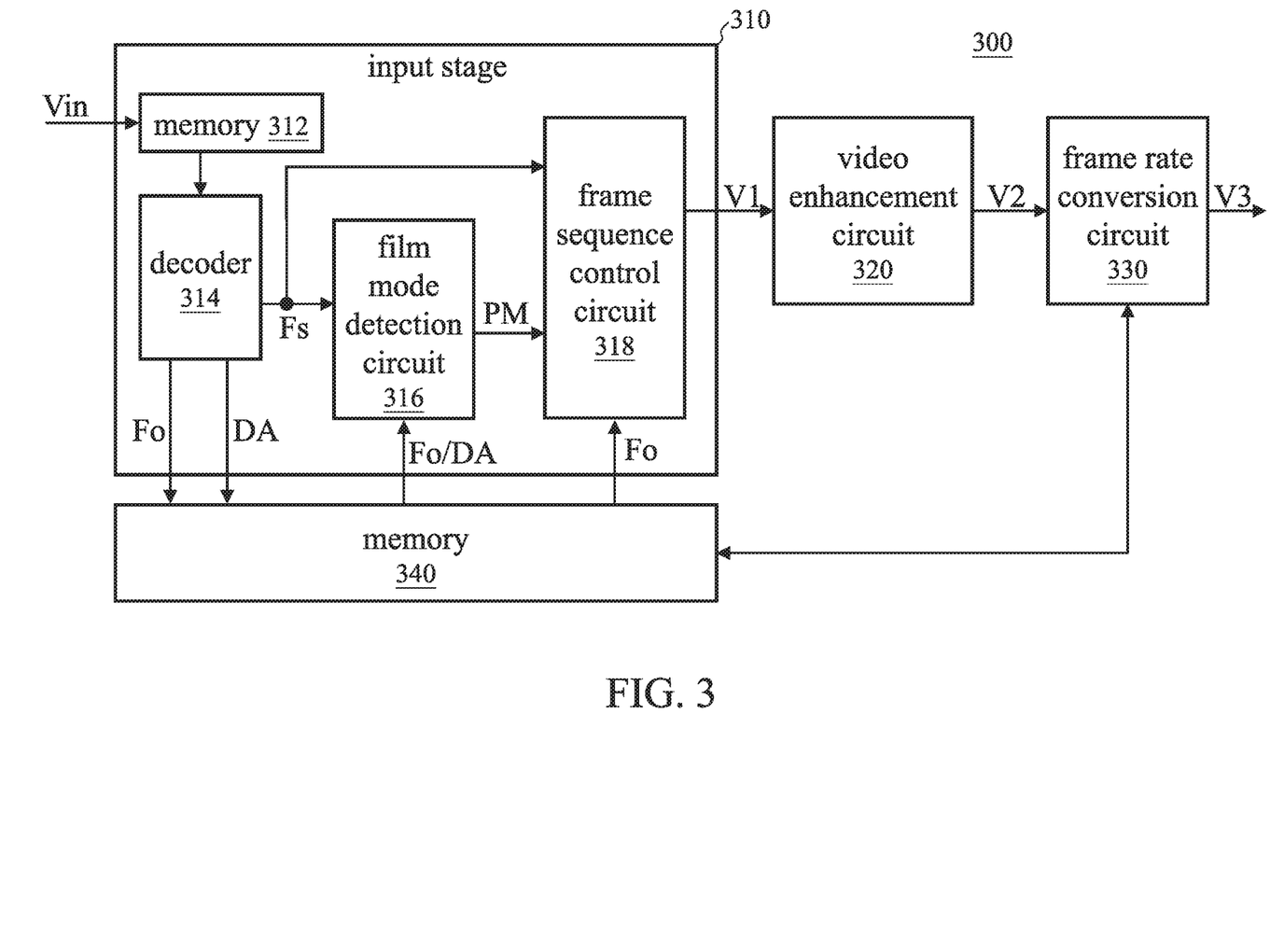
FIG. 3 illustrates a functional block diagram of the image processing device according to an embodiment of the present invention.
Figure 4:
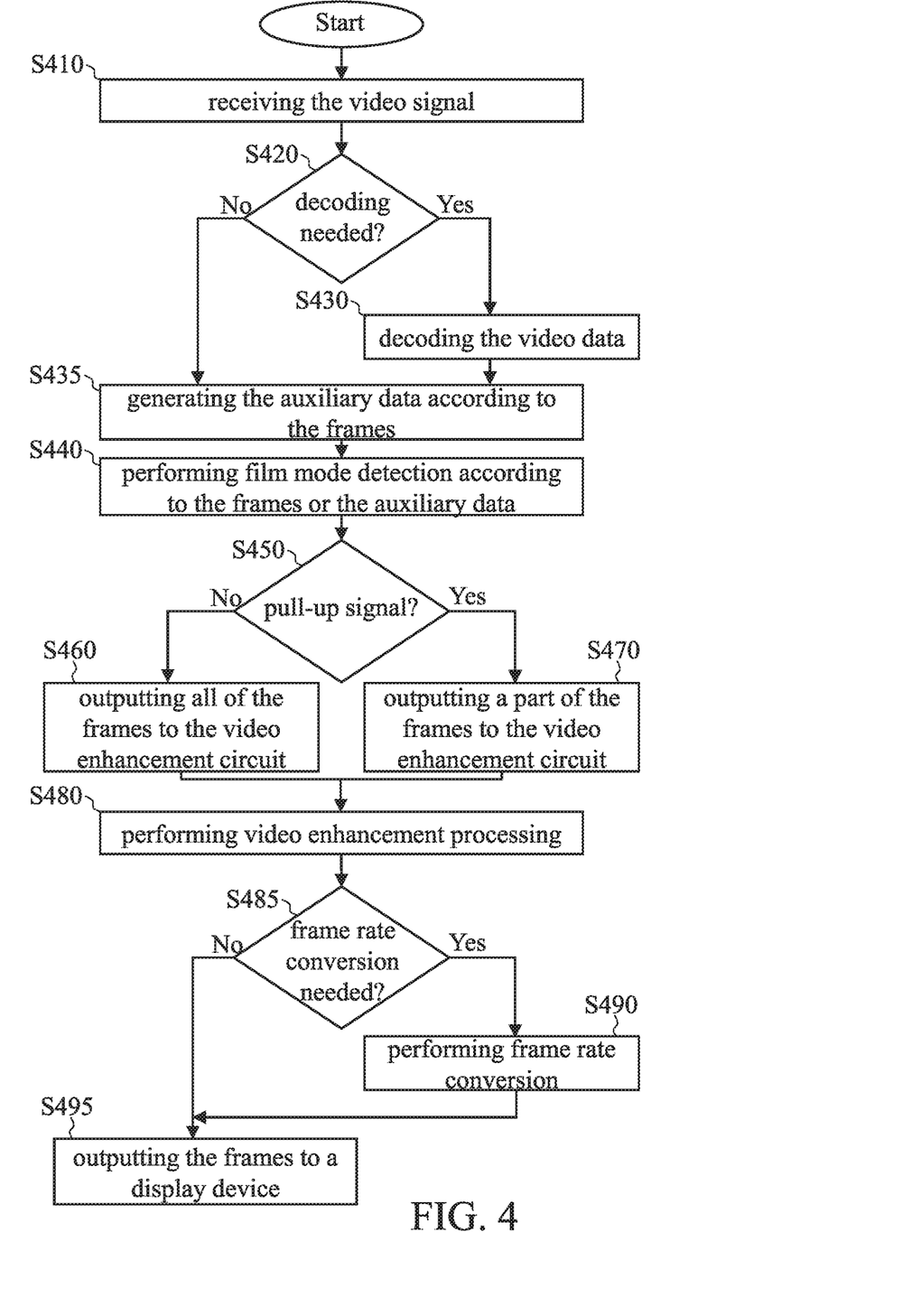
FIG. 4 illustrates a flow chart of an image processing method according to an embodiment of the present invention.

FIG. 3 is a functional block diagram of the image processing device according to an embodiment of the present invention. The image processing device 300 includes an input stage 310, a video enhancement circuit 320, a frame rate conversion circuit 330, and a memory 340. The input stage 310 includes a memory 312, a decoder 314, a film mode detection circuit 316, and a frame sequence control circuit 318. The memory 340 can be a frame buffer. FIG. 4 is a flow chart of an image processing method according to an embodiment of the present invention. Reference is made to both FIGS. 3 and 4 for the following descriptions.

First, the input stage 310 receives the video signal Vin (step S410). The video signal Vin can be a decoded or undecoded video signal. The decoded video signal is, for example, from a set-up box and is inputted to the image processing device 300 through a digital video interface. The digital video interface includes, but not limited to, High Definition Multimedia Interface (HDMI) and DisplayPort (DP). When the video signal Vin is inputted to the input stage 310, the video data is written to the memory 312. The memory 312 is, for example, a line buffer. The decoder 314 reads the video data from the memory 312 and determines whether the video signal Vin needs to be decoded (step S420).

In an embodiment, the video signal Vin is an undecoded video signal (step S420 being positive). The decoder 314 decodes the video data (step S430) to generate a plurality of frames Fo and the frame order information Fs indicating the order of the frames Fo. The decoder 314 may further include an image size adjustment and storage circuit (not shown) that processes the frames Po to generate the auxiliary data DA (step S435). Step 5435 is optional. The auxiliary data DA is, for example, a thumbnail, a color space, or a histogram of the frames Fo. Both the frames Fo and the auxiliary data DA are stored in the memory 340.

The approaches to generating the foregoing thumbnail, color space, and histogram is well known to those of ordinary skill in the art, and the following references are hereby provided for realizing the implementations.

Thumbnail: en.wikipedia.org/wiki/Image_scaling;
color space: en.wikipedia.org/wiki/HSL_and_HSV; and
histogram: en.wikipedia.org/wiki/Histogram.

The film mode detection circuit 316 reads from the memory 340 the frames Fo or the auxiliary data DA (e.g., reads 10 to 15 frames Fo, or auxiliary data DA corresponding to these frames Fo) and learns the order of the frames Fo or the auxiliary data DA according to the frame order information Fs. The film mode detection circuit 316 further performs film mode detection by comparing the frames Fo or the auxiliary data DA (step S440) to thereby generate a mode signal PM indicating the film mode of the video signal Vin. When the video signal Vin is not a pull-up signal, the mode signal PM indicates that the frames Fo do not contain frames that are substantially the same. When the video signal Vin is a pull-up signal, the mode signal PM indicates a pull-up mode of the video signal Vin, for example, indicating one of the following pull-up modes: 22, 23, and 3223. Since the amount of data of the auxiliary data DA is smaller than that of the frames Fo, when the film mode detection circuit 316 performs film mode detection according to the auxiliary data DA, the memory bandwidth can be saved.

The film mode detection circuit 316 can perform film mode detection using the following method. In some embodiments, the film mode detection circuit 316 calculates the similarity flag[t] of two frames that are adjacent to each other in time:

$$\text{flag}[t] = \Sigma_i^W \Sigma_j^H (\text{Img}[t][i][j] - \text{Img}[t-1][i][j]) \quad (1)$$

where Img[t] is the image data at time t, i and j are parameters of the pixel position, and W×H stands for all pixels of the image data. Img[t] may be one of the aforementioned frames Fo or the corresponding auxiliary data DA.

In other embodiments, the similarity flag[t] is:

$$\text{flag}[t]=\Sigma_i{}^W\Sigma_j{}^H W(\text{Img}[t][i][j]-\text{Img}[t-1][i][j])\times(\text{Img}[t][i][j]-\text{Img}[t-1][i][j]) \quad (2)$$

where W(Img[t][i][j]–Img [t–1][i][j]) is a weighted function. When the similarity flag[t] is smaller than a predetermined value, it means that the two frames are substantially the same.

Then, the frame sequence control circuit 318 reads the frames Fo from the memory 340 and refers to the frame order information Fs to obtain the order of the frames Fo, and learns whether the video signal Vin is a pull-up signal by referring to the mode signal PM (step S450). The frame sequence control circuit 318 selects some or all of the frames Fo according to the mode signal PM to generate the video data V1. More specifically, when the video signal Vin is not a pull-up signal, the mode signal PM indicates that the frames Fo do not contain frames that are substantially the same, so the frame sequence control circuit 318 outputs all of the frames Fo in chronological order according to the frame order information Fs to thereby generate the video data V1 (step S460). When the video signal Vin is a pull-up signal, the frames Fo contain frames that are substantially the same; thus, the frame sequence control circuit 318 selects a part of the frames Fo according to the mode signal PM and the frame order information Fs to thereby generate the video data V1 (step S470). For example, assuming that the sorted frames Fo are exemplified by the video data V1 of FIG. 2, the frame sequence control circuit 318 learns according to the mode signal PM that the first three frames are identical frames (frame (A)), the fourth and fifth frames are identical frames (frame (B)), and, accordingly, selects one frame from the first three frames of the frames Fo as the first frame of the video data V1, selects one frame from the fourth and fifth frames of the frames Fo as the second frame of the video data V1, and so on. The resulting video data V1 outputted by the frame sequence control circuit 318 is shown in FIG. 5.

In some embodiments, the frame sequence control circuit 318 can also optionally transmit the mode signal PM to the video enhancement circuit 320, so that the video enhancement circuit 320 can immediately know the film mode of the video signal Vin and perform video processing accordingly.

Next, the video enhancement circuit 320 performs video enhancement processing (such as noise reduction, sharpness improvement, and scaling) on the video data V1, and then outputs the video data V2 (step S480). As shown in FIG. 5, the frames contained in the video data V2 are substantially the same as the frames contained in the video data V1. The frame rate conversion circuit 330 then determines whether or not frame rate conversion is required (step S485), and optionally performs frame rate conversion (step S490). In some embodiments, the frame rate conversion circuit 330 can be activated (turned on) or deactivated (turned off) according to the mode signal PM. For example, if the video signal Vin is not a pull-up signal, the frame rate conversion circuit 330 does not operate (i.e., the frame rate conversion circuit 330 is deactivated and step S490 is skipped). If, on the other hand, the video signal Vin is a pull-up signal, the frame rate conversion circuit 330 operates (i.e., the frame rate conversion circuit 330 is activated and step S490 is performed). Finally, the frame rate conversion circuit 330 outputs the video data V3 to a display device (e.g., a panel) (step S495). The content of the video data V3 is shown in FIG. 5, in which frame (A, B)$_1$ is generated based on frame (A) and frame (B), and frames (B, C)$_1$ and (B, C)$_2$ are generated based on frame (B) and frame (C).

Figure 5:
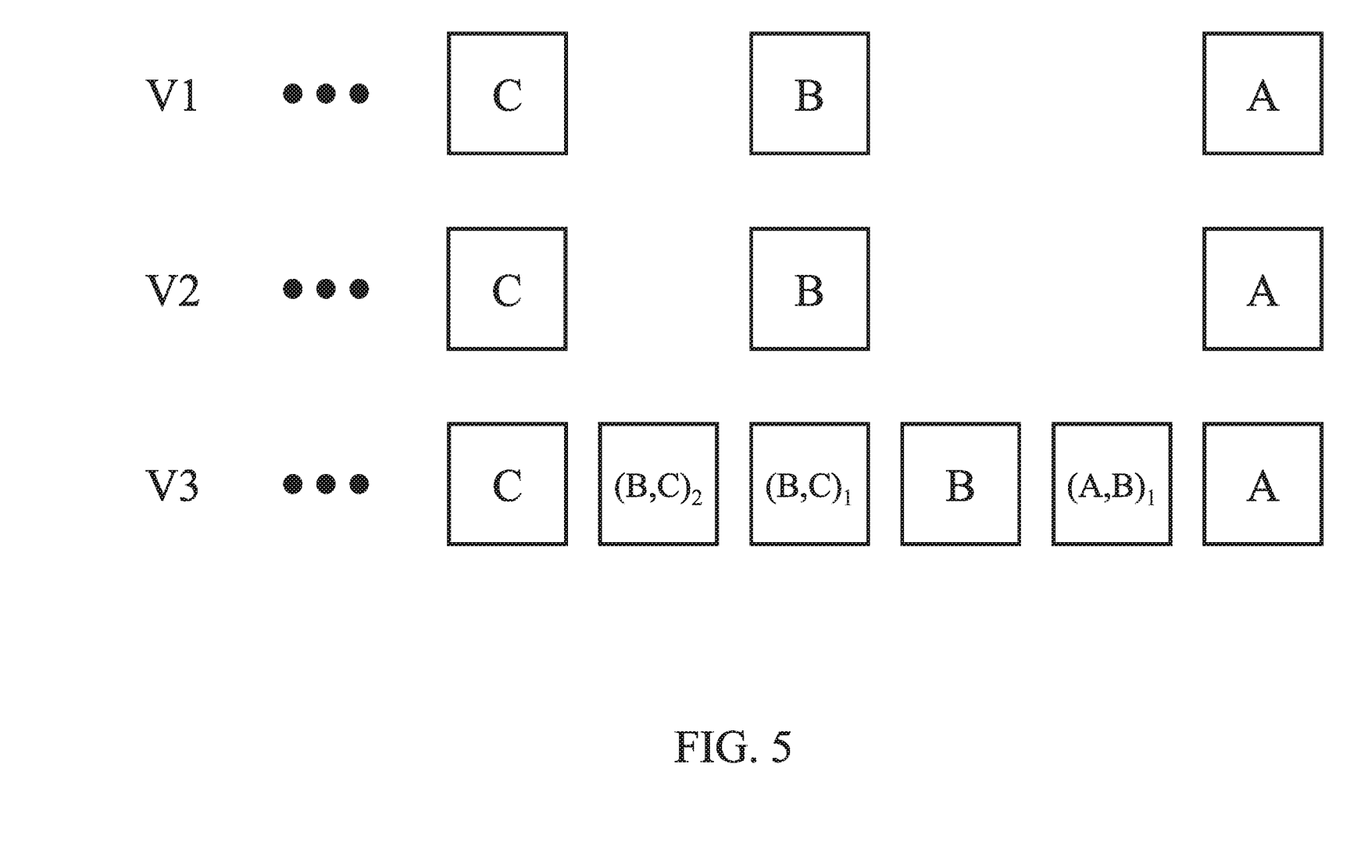
FIG. 5 illustrates a change in frames of an image processing device of the present invention.

Comparing FIG. 2 and FIG. 5, when the video signal Vin is a pull-up signal, the number of frames of the video data V1 in FIG. 5 is smaller than the number of frames of the video data V1 in FIG. 2, and the number of frames of the video data V2 in FIG. 5 is smaller than the number of frames of the video data V2 in FIG. 2. This implies that the video enhancement circuit 320 can process fewer frames (i.e., reducing power consumption) and the frame rate conversion circuit 330 stores fewer frames to the memory 340 (i.e., reducing the demand for memory bandwidth).

In another embodiment, the video signal Vin in FIG. 3 is a decoded video signal (step S420 being negative). In this case, the video signal Vin contains the frames Fo, and the frames Fo are arranged in chronological order. Thus, the decoder 314 does not generate the frame order information Fs. Similarly, the decoder 314 can optionally use the image size adjustment and storage circuit to process the frames Fo to thereby generate the auxiliary data DA (step S435). Next, the film mode detection circuit 316 performs film mode detection based on the frames Fo or the auxiliary data DA (step S440). Then, the frame sequence control circuit 318 determines whether the video signal Vin is a pull-up signal according to the mode signal PM (step S450), and performs step S460 or step S470 according to the determination result. Since the frames Fo read from the memory 340 by the frame sequence control circuit 318 are already arranged in order, the frame sequence control circuit 318 does not need to refer to the frame order information Fs in steps S460 and S470 (i.e., in this embodiment the decoder 314 does not generate the frame order information Fs).

Figure 6:
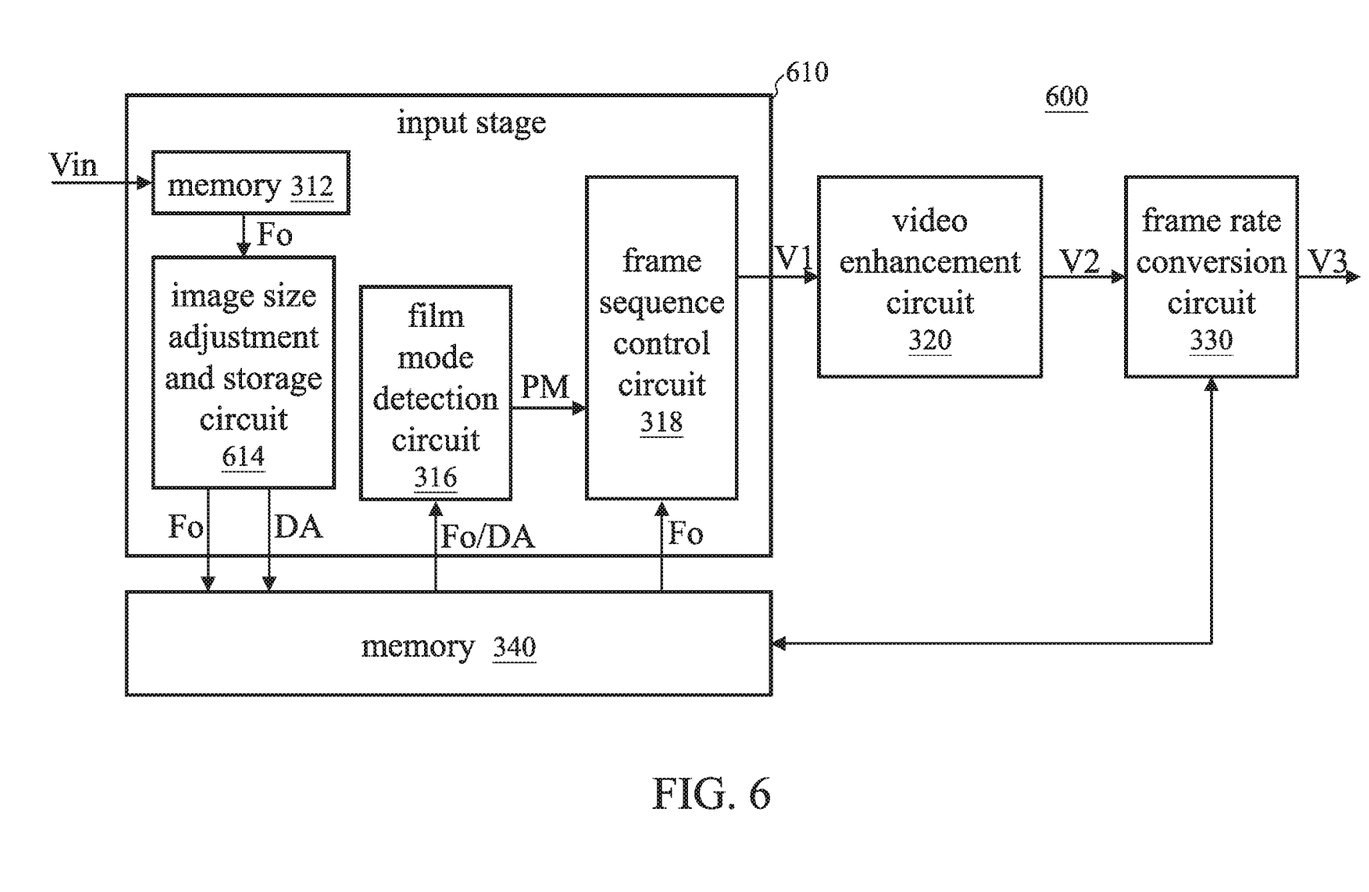
FIG. 6 illustrates a functional block diagram of the image processing device according to another embodiment of the present invention.

FIG. 6 is a functional block diagram of the image processing device according to another embodiment of the present invention. The image processing device 600 includes an input stage 610, a video enhancement circuit 320, a frame rate conversion circuit 330, and a memory 340. The input stage 610 includes a memory 312, an image size adjustment and storage circuit 614, a film mode detection circuit 316, and a frame sequence control circuit 318. In this embodiment, the video signal Vin is a decoded video signal (i.e., in this case step S420 and step S430 can be skipped); therefore, the video signal Vin contains the frames Fo, and the frames Fo are arranged in order. The image processing device 600 is similar to the image processing device 300 except that the input stage 610 does not have a decoding function but utilizes the image size adjustment and storage circuit 614 to process the frames Fo to generate the auxiliary data DA (step S435). Likewise, step S435 is optional. Elements in FIGS. 6 and 3 denoted by the same numerals have the same or similar functions, and the descriptions are thus omitted for brevity.

The foregoing decoder 314 and image size adjustment and storage circuit 614 can be implemented by a digital signal processor (DSP). The image size adjustment and storage circuit 614 or the image size adjustment and storage circuit built in the decoder 314 may further include an image size adjustment module and a color space conversion module. In some embodiments, instead of accessing the memory 340, the film mode detection circuit 316 can obtain the frames Fo or the auxiliary data DA directly from the decoder 314 and the image size adjustment and storage circuit 614. In some embodiments, the frame sequence control circuit 318 may perform information reduction operation on the frame(s) that was(were) not selected in step S470, and output the information, resulting from the information reduction operation, together with the selected frame to the video enhancement circuit 320. The information resulting from the information reduction operation is, for example, a thumbnail of the original frame, a color space, and/or a histogram.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing device comprising:
   a decoder configured to decode a video signal to generate a plurality of frames and frame order information indicating the order of the frames and to process the frames to generate an auxiliary data associated with the frames, wherein an amount of data of the auxiliary data is smaller than an amount of data of the frames;
   a film mode detection circuit coupled to the decoder and configured to determine whether the frames contain substantially the same frames by calculating frame similarities using the auxiliary data;
   a frame sequence control circuit coupled to the film mode detection circuit and configured to select the frames according to whether the frames contain substantially the same frames to generate a plurality of selected frames; and
   a video enhancement circuit coupled to the frame sequence control circuit and configured to perform video enhancement processing on the selected frames;
   wherein when the frames do not contain substantially the same frames, the selected frames are the same as the frames, and when the frames contain substantially the same frames, the selected frames are part of the frames.

2. An image processing method comprising:
   decoding a video signal to generate a plurality of frames and frame order information indicating the order of the frames;
   processing the frames to generate an auxiliary data associated with the frames, wherein an amount of data of the auxiliary data is smaller than an amount of data of the frames;
   determining whether the frames contain substantially the same frames by calculating frame similarities using the auxiliary data;
   selecting the frames according to whether the frames contain substantially the same frames to generate a plurality of selected frames; and
   performing video enhancement processing on the selected frames;
   wherein when the frames do not contain substantially the same frames, the selected frames are the same as the frames, and when the frames contain substantially the same frames, the selected frames are part of the frames.

3. An image processing device comprising:
   a film mode detection circuit configured to determine whether the frames contain substantially the same frames by calculating frame similarities using an auxiliary data associated with a plurality of frames;
   a frame sequence control circuit coupled to the film mode detection circuit and configured to select the frames according to whether the frames contain substantially the same frames to generate a plurality of selected frames; and
   a video enhancement circuit coupled to the frame sequence control circuit and configured to perform video enhancement processing on the selected frames;
   wherein when the frames do not contain substantially the same frames, the selected frames are the same as the frames, and when the frames contain substantially the same frames, the selected frames are part of the frames.

4. The image processing device of claim 3 further comprising:
   an image size adjustment and storage circuit coupled to the film mode detection circuit and configured to process the frames to generate the auxiliary data;
   wherein an amount of data of the auxiliary data is smaller than an amount of data of the frames.

* * * * *